United States Patent [19]
Griffith et al.

[11] 3,912,399
[45] Oct. 14, 1975

[54] METHOD OF AND ASSEMBLY FOR MEASURING EQUIVALENT SPHERE ILLUMINATION

[75] Inventors: James William Griffith, Dallas, Tex.; Robert Dale Zeller, Newark, Ohio

[73] Assignee: Johns-Manville Corporation, Denver, Colo.

[22] Filed: Feb. 27, 1974

[21] Appl. No.: 446,247

[52] U.S. Cl. .................................. 356/229; 356/256
[51] Int. Cl.² ............................................ G01J 1/10
[58] Field of Search ............................ 356/229–232, 356/236, 256; 250/228

[56] References Cited
OTHER PUBLICATIONS

Blackwell, Illuminating Engineering, Vol. 65, No. 4, Apr. 1970, pages 267–291.
RQQ Report No. 4, Illuminating Engineering, Vol. 65, Aug. 1970, pages 504–510.
Lewin et al., Illuminating Engineering, Vol. 66, No. 1, Jan. 1971, pages 67–72.
Eastman, Illuminating Engineering, Vol. 66, No. 2, Feb. 1971, pages 99–106.
Florence et al., Illuminating Engineering, Vol. 66, No. 3, Mar. 1971, pages 149–155.
Lewin et al., Journal of the Illuminating Engineering Society, Vol. 2, No. 3, Apr. 1973, pages 216–229.
Blackwell et al., Journal of the Illuminating Engineering Society, Vol. 2, No. 3, Apr. 1973, pages 230–253.
Blackwell et al., Journal of the Illuminating Engineering Society, Vol. 2, No. 3, Apr. 1973, pages 254–283.
Blackwell et al., Journal of the Illuminating Engineering Society, Vol. 2, No. 3, Apr. 1973, pages 284–298.

*Primary Examiner*—Ronald L. Wibert
*Assistant Examiner*—F. L. Evans
*Attorney, Agent, or Firm*—Robert M. Krone; Stephen C. Shear

[57] ABSTRACT

The measurement of equivalent sphere illumination on a given task located in a lighted area is disclosed herein. This is accomplished by comparing the task located in the lighted area with a second task which is, in fact, illuminated with sphere illumination. The two tasks are viewed in accordance with specific optical procedures to determine the equivalent sphere illumination on the given task.

30 Claims, 5 Drawing Figures

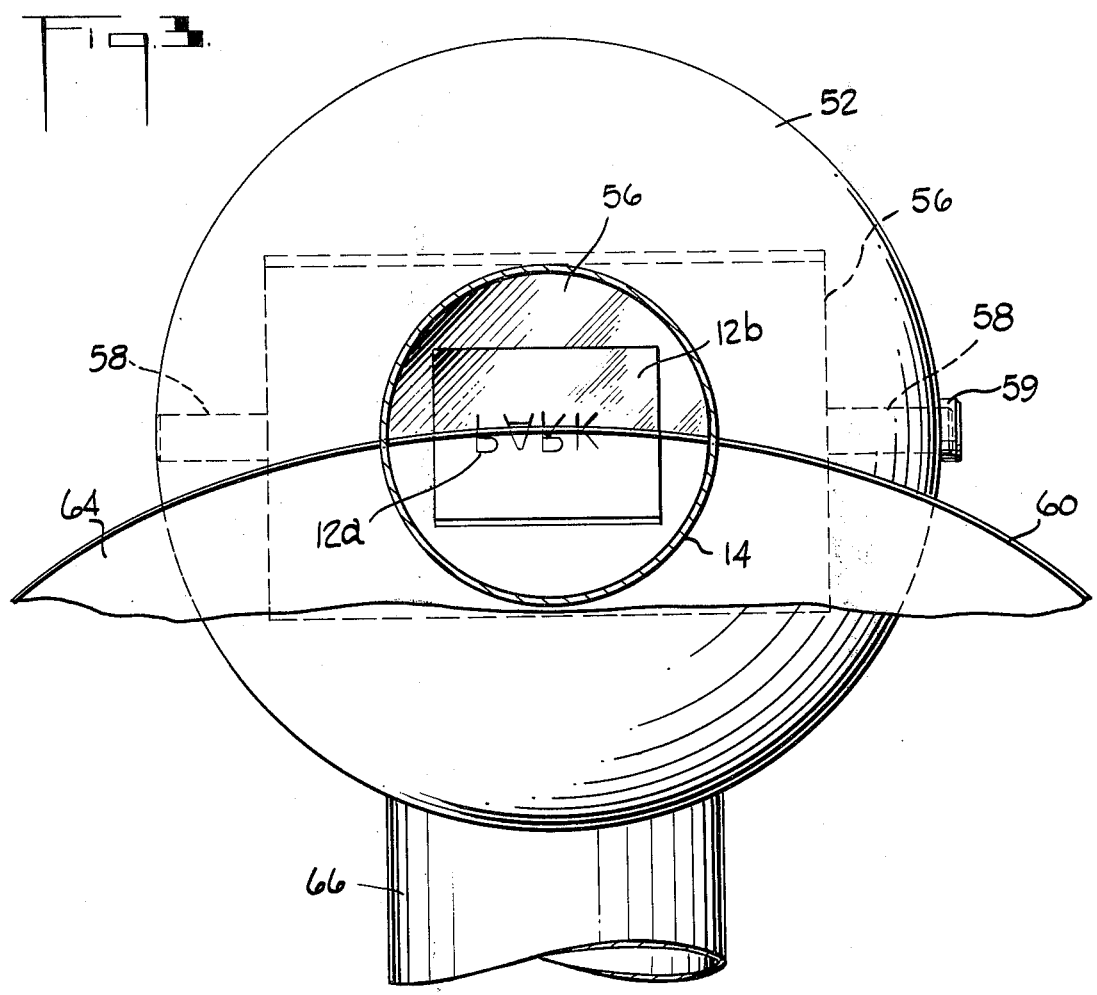
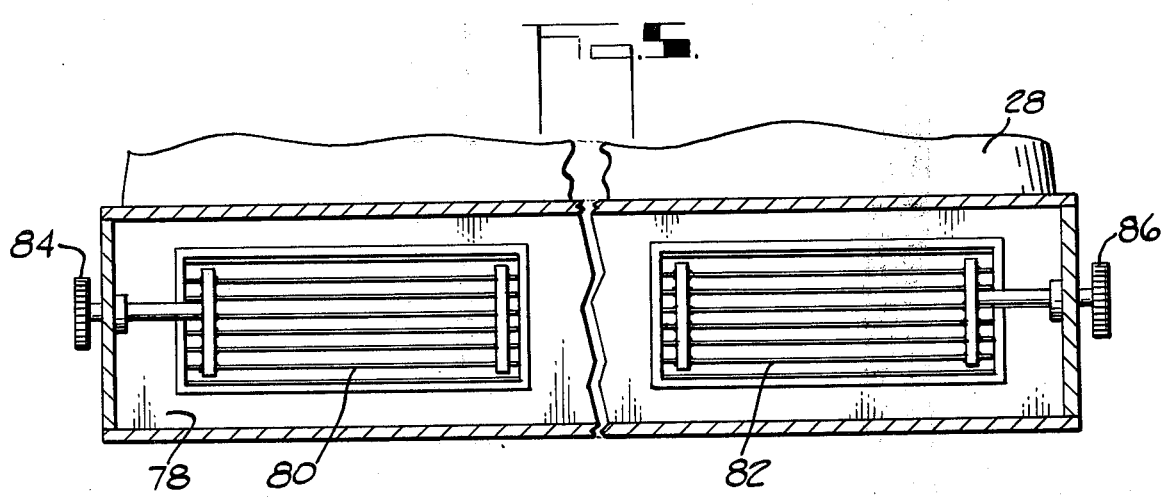

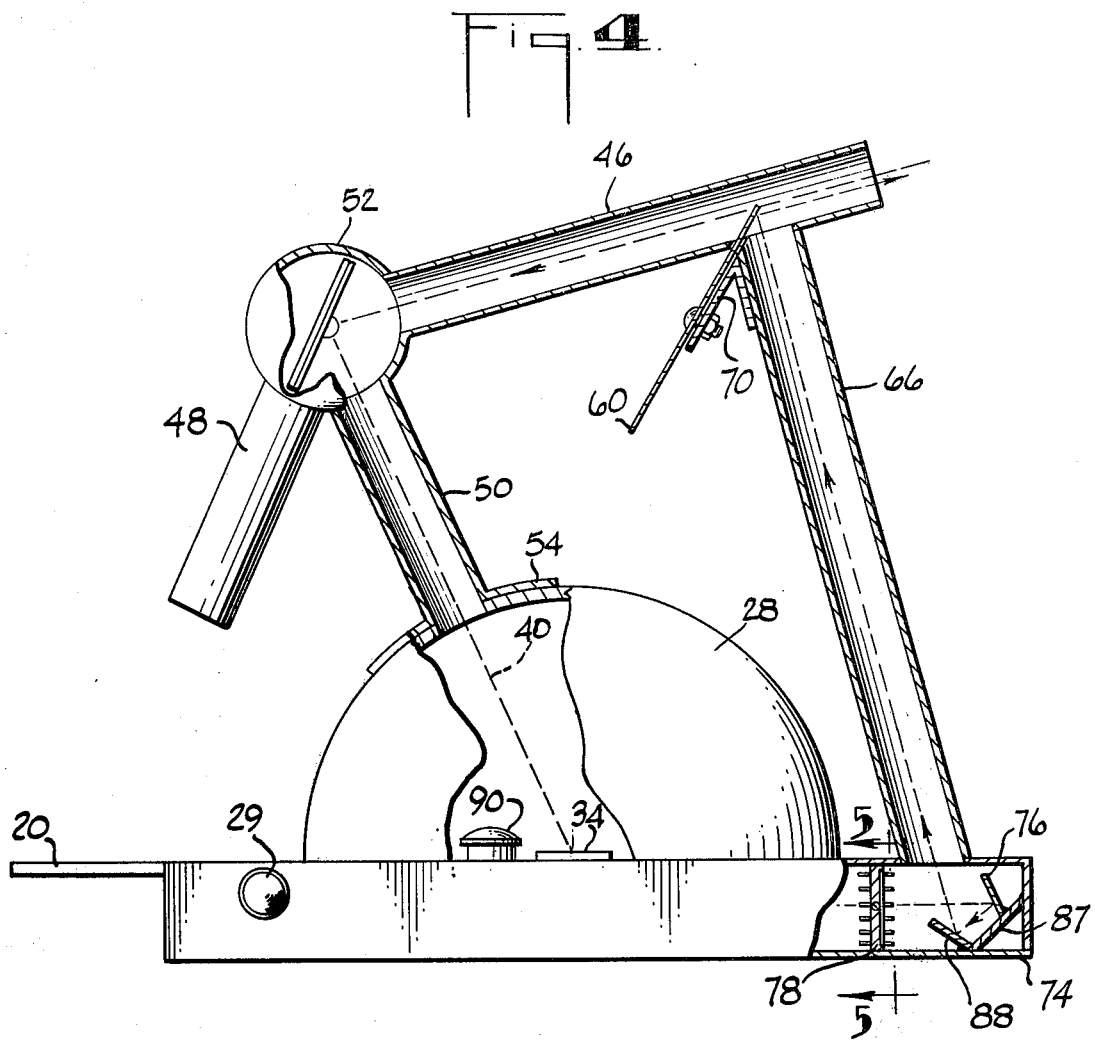

METHOD OF AND ASSEMBLY FOR MEASURING EQUIVALENT SPHERE ILLUMINATION

BACKGROUND OF THE INVENTION

The present invention relates generally to sphere illumination and more particularly to a method of and assembly for measuring equivalent sphere illumination.

The term "equivalent sphere illumination", commonly referred to and hereinafter referred to as ESI, is well known in the lighting industry. The illumination on a task, for example, the writing on a piece of paper, within a room depends upon the position of the task within the room and the particular lighting arrangement utilized therein. In any event, while most conventional lighting arrangements do not provide complete sphere illumination, they do provide illumination, which produces some visibility equal to the visibility produced by an equivalent amount of to sphere illumination. The term ESI refers to this level of sphere illumination.

The amount of ESI on a task within a conventionally lit room will depend not only on the position of the task within the room but also upon the orientation of the task relative to the point at which it is viewed. If, for example, at the viewing point of the task there is a loss of contrast from veiling reflection, i.e., reflected glare off the task, the ESI as viewed at that point will be small. On the other hand, where there is little loss in contrast at the viewing point, the ESI will be greater.

An often used "yardstick" of the lighting industry in evaluating the quality of illumination in a lighted room is the amount of ESI on a task, as viewed from a particular point. A typical task is a typed letter or other dark symbol on a sheet of white paper, the sheet being located on a flat, horizontal surface. A standard viewing point is above the paper at an angle of approximately 25° from a line normal to the paper, i.e., the average viewing point of a person sitting at a desk or table reading what is typed on the paper. Generally, as stated above, it has been found that less reflected glare from the paper results in higher ESI values while greater reflected glare results in lower ESI values.

While ESI is one sound and, more than likely, permanent tool is evaluating given lighting arrangements, there has heretofore been a substantial drawback resulting from its use. This drawback resides in the manner in which the ESI is measured. Most of the known methods provided heretofore are complicated, time consuming and expensive. As will be seen hereinafter, the present invention provides an uncomplicated, rapid and economical method and assembly for measuring ESI on a task within a lighted area.

BRIEF SUMMARY OF THE INVENTION

An object of the present invention is to provide an uncomplicated, rapid and economical method of determining the amount of ESI on a task, as viewed from a given viewing point.

Another object of the present invention is to provide an assembly which is especially suitable for carrying out the aforestated method.

Still another object of the present invention is to provide an assembly of the last mentioned type which may be readily transported from one location to another.

In accordance with the present invention, a given object is positioned within a lighted area, i.e., the area to be evaluated. The object is preferably a sheet of light colored paper with dark letters or other such symbols on one side, i.e., the side facing up. The letters or symbols may be referred to as the task to be evaluated and the remaining exposed surface of the sheet of paper may be referred to as the background or reference.

The task and at least a portion of the background are viewed from a given viewing point, for example, the aforedescribed standard viewing point, through an adjustable light filtering device. This device is adjusted to a position which provides a specific degree of visibility, preferably threshold visibility, of the task at the viewing point and through the device. However, by appropriate means, the luminance of the background is made to at least appear unchanged as viewed through the adjusted light filtering device from the same viewing point.

A similar second object, actually a substantially identical object for best results, is positioned on a light controlled area and illuminated with sphere illumination. To provide this sphere illumination, the light controlled area preferably includes a hemispherical surface which substantially uniformly diffusely reflects light directed thereon. The second object, i.e., the second task and at least a portion of the second background or reference, is viewed through the already adjusted light filtering device with the orientation of the second object, as viewed, being identical to the orientation of the given object, as the latter is viewed.

While viewing the second object through the adjusted light filtering device, the intensity of sphere illumination on the object is varied to the point which provides equal visibility to both the given task and the second task, i.e., preferably threshold visibility, while, by appropriate means, the luminance of the second background is made to appear unchanged, as viewed through the already adjusted light filtering device. The value of the sphere illumination at this point is the ESI on the given object from the point at which the given object is viewed. By measuring this value, the ESI is readily determined.

BRIEF DESCRIPTION OF THE DRAWINGS

FIG. 3 is an enlarged sectional view taken generally along line 3—3 in FIG. 2.

FIG. 4 is partially broken away side elevational view of the assembly of FIG. 1 with a portion of the assembly being shown in section and also being shown in a different mode of operation than that illustrated in FIG. 2.

FIG. 5 is a sectional view taken generally along line 5—5 in FIG. 4.

DETAILED DESCRIPTION AND PREFERRED EMBODIMENTS

Figure 1:
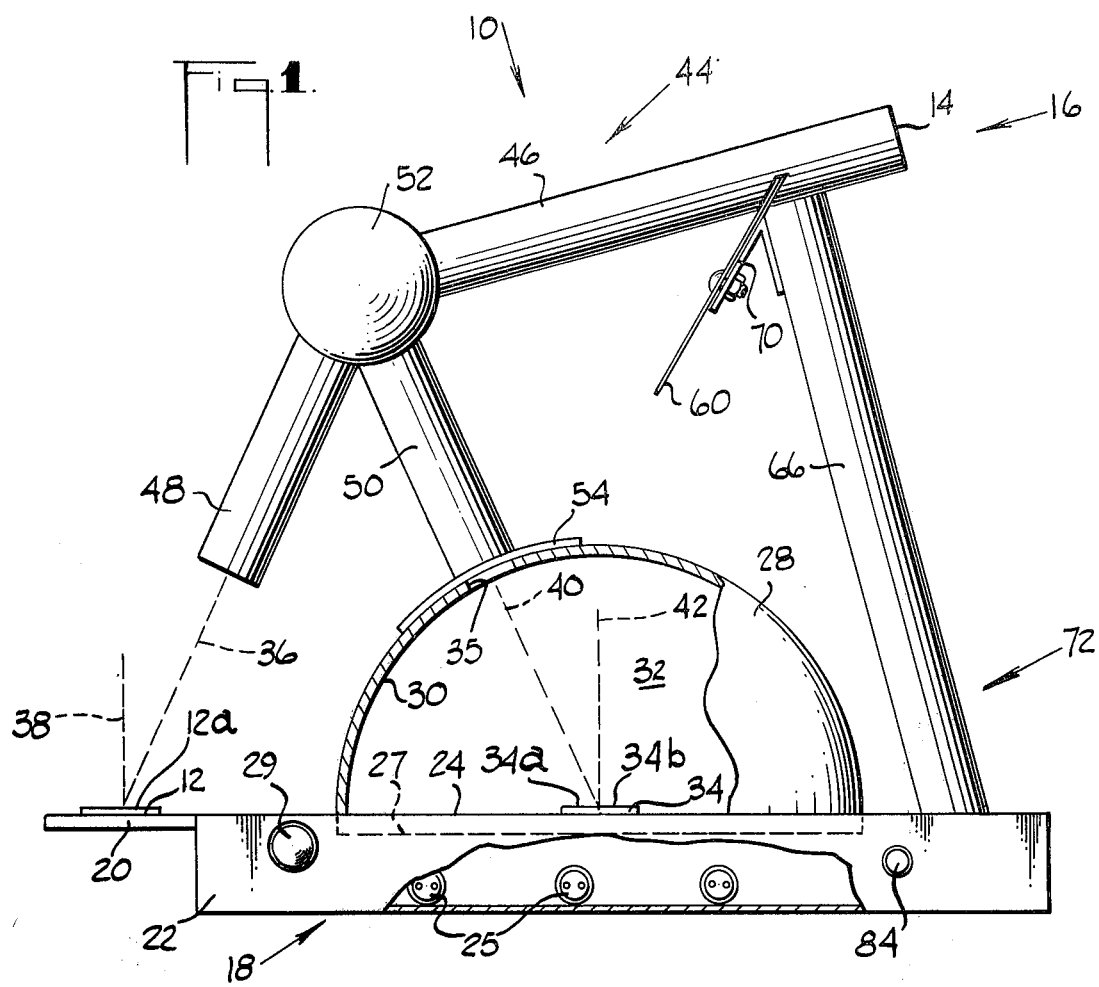
FIG. 1 is a partially broken away side elevational view of an assembly which is provided for measuring ESI on an object and which is constructed in accordance with the present invention.

Turning now to the drawings, wherein like components are designated by like reference numerals throughout the various figures, as assembly 10, constructed in accordance with the present invention, is illustrated in FIG. 1. As will be seen hereinafter, assembly 10 is provided for determining the amount of equivalent sphere illumination (ESI) on an object 12, as viewed from a given viewing point, for example, point 14 along a line 36. To accomplish this in a specific way, to be described hereinafter, assembly 10 includes an optical arrangement 16 and an arrangement 18 for producing sphere illumination. Assembly 10 may also include means 20 for supporting object 12 relative to viewing point 14, line 36 and arrangements 16 and 18.

Object 12 may be any suitably sized and shaped object including two contrasting colored segments, i.e., a task and a reference, or it may be two separate contrasting colored objects. However, object 12 is preferably a sheet of light colored (preferably white) paper having a typed or other such contrasting colored symbol (preferably black or dark blue) on one surface. For purposes of the present description of assembly 10, it will be assumed that object 12 is a sheet of white paper including such a symbol. The symbol will hereinafter be referred to as a task and the remaining surface of the sheet of paper will hereinafter be referred to as a reference or background.

As illustrated in FIG. 1, arrangement 18 includes a light box 22 having one side, for example, top side 24, which allows light from within the box to pass therethrough. Side 24 is preferably designed to uniformly diffuse this light, which originates from one or more light sources 25 located within the light box and suitably mounted by means not shown. Moreover, light box 22 includes means for varying the light, passing through top side 24. This may be accomplished, for example, by varying the electrical voltage across the light sources or by maintaining the light sources energized and utilizing a mechanical filtering system. Both of the methods could be readily provided by one with ordinary skill in the art. In one embodiment, a mechanical shutter arrangement, represented by dotted line 27, movable between a completely closed and a completely open position is provided. Such an arrangement could be readily provided by one with skill in the art. In this regard, a nob 29 or other such means suitably connected to the shutter arrangement could be utilized for manually varying the amount of light passing up through side 24 from no light at all to most of the light passing therethrough. The maximum amount of light which light box 22 must provide will depend upon several factors to become apparent hereinafter.

Arrangement 18 also includes a light impervious shell 28 having a hemispherical internal surface 30. This surface is one which, as close as possible, perfectly and uniformly diffusely reflects light. One way and probably the more accurate way of accomplishing this is to provide surface 30 with a uniform coating of smoked magnesium oxide, that is, the precipitate resulting from burning magnesium. One drawback in using smoked magnesium oxide is that it displays little peel or chip resistance. Hence, a second probably slightly less accurate but suitable way of providing uniform light diffusion is to provide surface 30 with a uniform coating of flat white paint. There may, of course, be other ways to provide surface 30 with uniform light diffusion. Shell 28 is positioned on top side 24 of light box 22 such that the top surface of this side and internal surface 30 of the shell together define a closed hemispherical chamber 32.

From the foregoing, it should be apparent that light passing from light box 22 through the top surface of side 24 and onto hemispherical surface 30 will be uniformly diffusely reflected by surface 30. This diffusely reflected light provides spherical illumination on the exposed surface or surfaces of an object within chamber 32. Because of practical considerations, absolute spherical illumination cannot be completely attained. For example, practically speaking, surface 30 is not absolutely hemispherical but is as close to hemispherical as possible. Further, this surface does not provide absolute uniform diffusion but, as close as practically possible, uniformly diffuses light directed thereon. However, for purposes of the present invention, slight deviations from the production of perfect spherical illumination within chamber 32 may be and, for all practical purposes, must be tolerated.

As stated above, assembly 10 includes means 20 for supporting object 12. Means 20 could be, for example, a desk or table or, as illustrated, a flat support connected to and extending from one side of light box 22. In any event, as will be seen hereinafter, the top supporting surface of means 20 is preferably coplanar with and adjacent to top side 24 of the light box.

As also stated above, assembly 20 includes optical arrangement 16. As will be described below, this arrangement is provided, at least in part, for viewing object 12 supported on support means 20 and also for viewing a reference object 34 located within chamber 32 and on top side 24. In this regard, shell 28 includes a slot or other such opening 35 extending from its outer surface to inner surface 30 for allowing external viewing into chamber 32. The size of slot 35 depends upon the size of object 34 but, in any case, should not be so large as to significantly adversely affect the production of sphere illumination within the chamber. The position of slot 35 will depend upon the desired position of reference object 34, which desired position will be discussed below.

Before providing a detailed description of optical arrangement 16, it should be noted that there is a required relationship between the positions of object 12, reference object 34 and viewing line 36. Generally speaking, let it be assumed that object 12, as viewed along viewing line 36 from point 14, is oriented in a particular way. Once this is established, the reference object 34, as viewed from its associated viewing point, for example, along the viewing line 40 (from point 14), must also be oriented in substantially the same way. In otherwords, the angle between line 36 and the normal 38 to surface 12 must be the same as the angle between viewing line 40 and the normal 42 to surface 34. In addition, for best results the objects are preferably viewed from the same optical distance. These required and preferred relationships are at least with respect to those surfaces of objects 12 and 34 which are to be viewed.

As stated above and in an actual working embodiment of the present invention, object 12 is preferably a sheet of white paper having black or other such contrasting symbols, the symbol, i.e., the task, being designated 12A, the surrounding surface, i.e., the background being designated 12B (see FIG. 3). Reference object 34 is preferably substantially identical to object 12 and therefore includes a similar task designated 34A and a similar background designated 34B. Also, in accordance with the working embodiment of the present invention, object 12 is positioned on support means 20 and oriented such that task 12A and background 12B, extending horizontally, are viewed along viewing line 36 from point 14 at an angle of approximately 25° with the line normal to the background. This is indicated by imaginary lines, lines 36 and 38 in FIG. 1 as stated previously. In a similar manner, the reference object 34, located on the surface 24 within chamber 32, is oriented such that task 34A and background 34B are viewed along line 40 from point 14 at an angle of approximately 25° with a line normal to the surface. This is illustrated in FIG. 1 by imaginary lines 40 and 42. As a further part of the preferred embodiment of the present invention, the optical distance between viewing point 14 and objects 12 and 34 is between approximately 14 inches and 16 inches.

Figure 2:
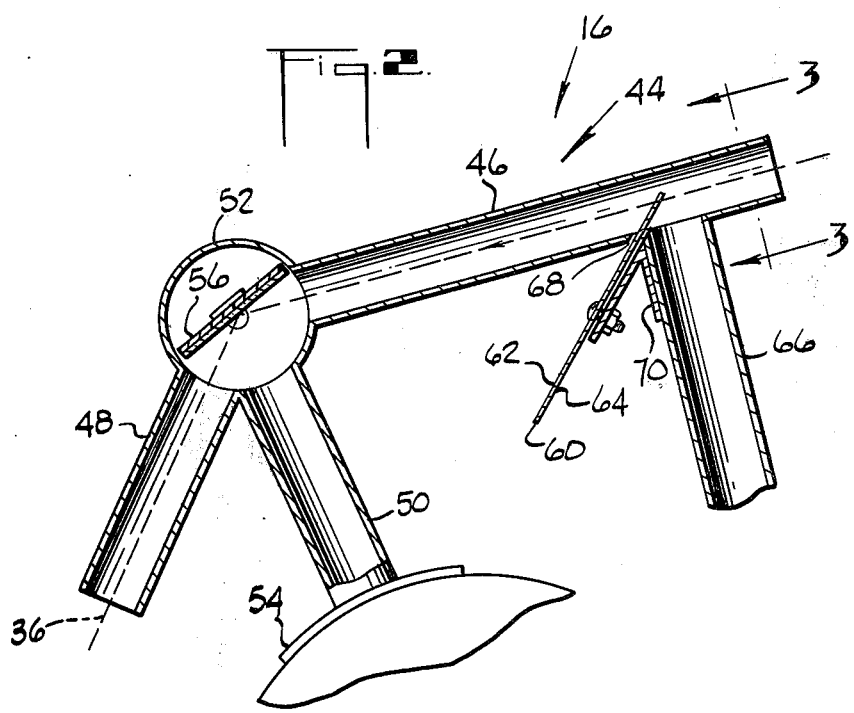
FIG. 2 is a sectional view of an optical portion of the assembly of FIG. 1.

Attention is now directed to FIGS. 2 and 4 which best illustrate optical arrangement 16. As shown in these figures, arrangement 16 includes a viewing segment 44 comprised of a first or common straight tubular viewing section 46 and two secondary straight tubular viewing sections 48 and 50. As shown, one end of common viewing section 46 defines viewing point 14 and the other end opens into an enlarged viewing segment 52 as do adjacent ends of secondary tubular sections 48 and 50. The otherwise free end of section 50 is mounted by suitable means such as a clamp 54 to the outside surface of shell 28 such that the opening through section 50 is in visual alignment with slot 35 through the shell.

The relative positions of tubular viewing sections 46, 48 and 50 and objects 12 and 34 should be noted. As illustrated in FIGS. 2 and 4, the secondary viewing sections 48 and 50 are angularly disposed relative to one another such that section 48 is in straight line alignment with the previously discussed imaginary line 36 and section 50 is in straight line alignment with previously discussed imaginary line 40. In this manner, the two objects 12 and 34 are located equidistant from enlarged viewed segment 52 and identically oriented relative to this segment.

In addition to the foregoing, viewing segment 44 includes an optical device which will allow one to view, alternatively, both objects 12 and 34 from viewing point 14, that is, from the free end of viewing section 46, such that both objects are optically the same distance from viewing point 14 and such that both objects are identically oriented as viewed from viewing point 14. Any suitable optical device may be provided. However, in accordance with the working embodiment of the present invention, this is accomplished by means of reflection. More specifically, viewing segment 44 includes a suitably sized mirror 56 which is positioned within enlarged segment 52. The mirror is mounted within this segment by suitable means including, for example, hinge pins 58 (FIG. 3), for movement between a first position and a second position to be described below. A nob such as nob 59 or other such externally located means innerconnected with mirror 56 may be provided for manually moving the mirror between its first and second position.

With mirror 56 in one of its two positions, for example, a first position, as seen in FIG. 2, the image of object 12, that is, the task 12A and background 12B are reflected off the mirror and up section 46 to viewing point 14. This is best shown in FIG. 3 which illustrates how the object is seen as viewed through viewing section 46 from viewing point 14. When the mirror is moved to its second position, as illustrated in FIG. 4, object 34, that is, the task 34A and background 34B of object 34 are seen in the same manner from viewing point 14.

In addition to viewing segment 44, optical arrangement 16 includes an adjustable light filtering device 60 which is capable of transmitting variable amounts of visible light from one surface 62 to a second surface 64. It should be capable of preventing all visible light from passing and it should also be capable of varying the amount of light, preferably in a linear fashion, to a point where all of the light or substantially all of the light can pass. In addition, the filter is preferably of the neutral density type, that is, it should be capable of absorbing the same proportions of light at all light frequencies. Further, for reasons to be described hereinafter, the back surface, for example surface 64, should be capable of reflecting some or all light directed thereon.

One type of device which performs all of the foregoing functions is a disc-shaped variable beam-splitter. Such a device, which is well known in the art, passes variable amounts of light from one surface to an opposite surface and reflects variable amounts of light from these surfaces, depending upon where on the surfaces the light impinges. A beam-splitter of this type may be readily provided as device 60. However, it is to be understood that other suitable means may also be used as device 60.

For reasons to be described hereinafter, optical arrangement 16 includes an additional tubular section 66 which opens at one end into tubular viewing section 46 near viewing point 14 and which extends downwardly at, for example, a right angle to the tubular viewing section. Beam-splitter 60 is mounted for rotation at its center by suitable means 70 which in turn is mounted to tubular section 66. The disc is positioned at the forward juncture of tubular sections 46 and 66 at a 45° angle with the latter and extends partially into section 46 partially over the opening between the two tubular sections. In this manner, some of the light reflected off the mirror 56 towards viewing point 14 must pass through or at least impinge on the beam-splitter. Hence, a portion of each of the objects 12 and 34 is seen through the filtering device or beam-splitter and a portion of each is seen outside the latter from viewing point 14. This is best illustrated in FIG. 3.

Optical arrangement 16 also includes an auxiliary light directing segment 72 which includes previously discussed tubular section 66 and which takes advantage of reflective surface 64 of beam-splitter 60. The primary objectives of segment 72 are to direct alternate beams of light of variable intensity up tubular section 66 and onto the back surface 64 of beam-splitter 60 such that at least some of the light from each of the beams of light is reflected towards viewing point 14, as illustrated by dotted lines in FIGS. 2 and 4. As will be seen hereinafter, these alternate beams of light are associated with the alternate viewing of objects 12 and 34, respectively.

The beams of light just discussed, may be provided in any suitable manner such as, for example, by providing separate adjustable light sources (not shown). However, advantage may be taken of the light source, actually sources, utilized by previously described light box 22. One way in which this is accomplished is by opening the lower end of tubular section 66 into an extention 74 of light box 22, which extension defines a chamber 76. As illustrated best in FIG. 4, the extension is open to tubular section 66 but closed to the interior of the light box by a suitable partition 78.

Partition 78 includes two side-by-side windows opening between chamber 76 and the interior of light box 22. As illustrated in FIG. 5, the windows are covered by respective adjustable shutter arrangements 80 and 82 which can be adjusted by suitably connected means such as nobs 84 and 86 respectively to vary the amount of light passing from the sources in the light box into chamber 76. Hence, by appropriate adjustment of nob 84, shutter arrangement 80 can be completely closed, completely opened or varied therebetween. Shutter arrangement 82 can be operated in the same way by nob 86. These arrangements can be readily provided and, in fact, can be similar to previously discussed arrangement 27. Light variable filters could be provided in lieu of these mechanical shutters. In addition, if separate light sources were used, there would be no need for the shutters or filters.

The light coming into chamber 76 through one of the shutter arrangements illuminates a suitably supported surface 87 similar to backgrounds 12A and 34A. Light from this surface is directed up tubular section 66 and onto back surface 64 of beam-splitter 60 by any suitable optical means. For example, a mirror 88 can be appropriately positioned within chamber 76 and suitably movably mounted therein, the mirror 88 and/or surface 87 being movable for alternatively redirecting light from shutter arrangements 80 and 82 up the tubular section. This could be readily provided by those skilled in the art.

Having described assembly 10, attention is now directed to a method of determining the amount of equivalent sphere illumination, i.e., ESI, on an object utilizing this assembly. The first step is to select a particular object, which is preferably a sheet of light colored paper, i.e., white paper having darker letters, i.e., black typed letters, i.e., a task 12A on its top surface, i.e., a background 12B. A second or reference object is then selected and is preferably substantially identical to the first selected object, thus including a task 34A and background 34B. The first selected object, that is, object 12 is appropriately positioned on support 20 and the reference object, that is, object 34 is appropriately positioned within chamber 32 in the manner shown in FIG. 1. In this regard, it should be noted that both objects are positioned such that the tasks 12A and 34A and portions of the backgrounds 12B and 34B are seen through beam-splitter 60 from viewing point 14 and second portions of the backgrounds are seen outside the beam-splitter from viewing point 14. This is illustrated in FIG. 3 with respect to object 12. The same conditions would be true when viewing reference object 34.

Having positioned the object, i.e., the sheets in the manner discussed, the task and a portion of the background of object 12 are viewed through tubular viewing section 46 from viewing point 14 through adjustable beam-splitter 60 while another portion of the background is simultaneously viewed outside the beam-splitter. The beam-splitter is adjusted, i.e., by rotation, to a point which provides a specific degree of visibility of the task from the viewing point, preferably threshold visibility, while the luminance of that portion of the background viewed through the beam-splitter is made to appear unchanged. This is accomplished by utilizing light directing segment 72 in conjunction with beam-splitter, as will be described directly below.

To accomplish the foregoing, let it be first assumed that the beam splitter is in position which allows substantially all light to pass therethrough from surface 62 to 64 and let it also be assumed that one of the shutter arrangements illustrated in FIG. 5, for example, shutter arrangement 80 is in a completely closed position. Let it also be assumed that mirror 56 in its first position, that is, that position which allows one to view object 12 from viewing point 14 and let it also be assumed that the previously discussed surface 87 and mirror 88 comprising part of light directing segments 72 are positioned for directing light associated with shutter arrangement 80 up tubular section 66. With these conditions met, beam-splitter 60 is adjusted, that is, rotated, thereby reducing the amount of light passing therethrough from surface 62 to surface 64. As this adjustment proceeds, the task becomes less visible and the luminance of that portion of the background viewed through the beam-splitter decreases. However, at the same time, approximately the same time, or thereafter the shutter arrangement 80 is slowly opened by means of, for example, nob 84 so that a continuously increasing amount of light is directed up the tubular section 66, some of which is reflected off the back surface 64 of the beam-splitter towards point 14. This light reflected off the back surface supplements in light passing through the beam-splitter from object 12 so that the luminance of that portion of the background being viewed through the beam-splitter appears greater than would be the case if no light were reflected off the back surface 64. The beam-splitter is ultimately adjusted so that the task is at threshold visibility from viewing point 14 while shutter arrangement 80 is ultimately adjusted so that the luminance of that portion of the background viewed through the beam-splitter from the point 14 appears identical to the luminance of that portion of the background viewed outside the beam-splitter, i.e., unchanged from point 14. Once these ultimate adjustments are made, they remain fixed throughout the rest of the procedure to be discussed below.

It should be pointed out that obtaining threshold visibility of the task can and is preferably accomplished through visual inspection. Also, maintaining the background at what appears to be constant can be accomplished by visual inspection. However, it can and preferably is accomplished by means of optical sensing. For example, conventional sensors (not shown) could be suitably positioned to compare the luminance of the background as it actually is and as it appears from behind beam-splitter 60. Suitably means could be readily provided to carry out this comparison and provide a readout which will indicate when the two are equal.

Having completed the initial segment of the present procedure for determining the amount of equivalent sphere illumination on object 12, the final segment of this procedure is begun. This first involves moving mirror 56 to its second position, that is, the position which allows viewing of reference object 34 from viewing point 14. As stated above, the task 34A and a portion of the background 34B are viewed through the beam-splitter and a portion of the background is viewed outside the beam-splitter. The surface 87 and mirror 88 are repositioned so that they are now associated with shutter arrangement 82. However, this shutter arrangement is preferably initially maintained closed. Hence, even though shutter arrangement 80 is at least partially open, little if any light is directed up tubular section 66.

Once the mirror 56, surface 87 and mirror 88 are positioned in the aforedescribed manner the shutter arrangement 27 is progressively open from its initially closed position by, for example, nob 29 while, at the same time, approximately the same time or thereafter, shutter arrangement 82 is slowly opened from its initially closed position by, for example, nob 86. Hence, light enters into chamber 32 for providing sphere illumination on sheet 34 and a second beam of light is directed up tubular section 66 and onto the back surface of beam-splitter 60. Both of these latter shutters are adjusted to ultimate positions such that the task 34A within chamber 32 is at threshold visibility as viewed through the beam-splitter from point 14 and such that the luminance of that portion of background 34B which is viewed through the beam-splitter from point 14 appears to remain unchanged, that is, it is to be equal to the luminance of that portion of the background viewed outside the beam-splitter.

To assure that both tasks, that is, the task associated with object 12 and the task associated with object 34 are equally visible from viewing point 14 through the filter, mirror 56 can be moved to its initial position for viewing object 12 and surface 87 and mirror 88 arrangement be moved to their initial positions associated with shutter arrangemet 80. Thereafter, these members can be moved back again, thus comparing the visibility of the two tasks. If further adjustments are required, this can be readily done by the aforedescribed procedure. In this regard, while assembly 10 has been shown to include manual means for adjusting mirrors 56 and 87, it should be understood a means for automatically making these changes either alone or simultaneously could be readily provided by one with ordinary skill in the art.

Having followed the aforedescribed procedure, the amount of sphere illumination which is not on object 34, is equal to the equivalent sphere illumination on object 12 as viewed from viewing point 14 at the angle at which the object is viewed. Hence, to determine this value, a meter 90 measuring illumination in foot candles may be provided on top side 24 within chamber 32. Because of slight imperfections in the production of sphere illumination, the meter or at least the sensor part of the meter is preferably positioned as close to object 34 as possible. A readout (not shown) could of course be provided outside of chamber 32.

It should be apparent from the foregoing, that the ESI value obtained depends on the particular lighting arrangement illuminating object 12. In this regard, for purposes of accuracy, the type of light sources in light box 22 are preferably similar to the light sources used in the particular arrangement being evaluated. It should also be apparent that the particular ESI value obtained also will depend upon the angle at which object is viewed from the given viewing points, for example, viewing point 14. As stated above, the particular 25° angle which was chosen to view object 12 and the distance at which it was viewed were chosen because this is the typical viewing angle and distance which a person sitting at a desk or flat table would read from if the piece of paper were located on that desk or table. The present invention is not limited to this positioning arrangement. In fact, in accordance with another standard, the angle would be 10° rather than 25°. This is because, quite often, the desk or table surfaces in some areas are tilted 15° from the horizontal.

It is to be understood that assembly 10, as described, is one embodiment of the present invention and is one way of carrying out the aforedescribed method. However, it is also to be understood that this method could be carried out by modified or actually dfferent assemblies. For example, the present invention is not limited to the disclosed shutter arrangements or disclosed optics for alternately viewing objects 12 and 34 or for alternately directing beams of light up tubular section 66 from respective shutter arrangements 80 and 82 but may use other known optic arrangements such as, for example, prisms. In fact, with respect to light directing segment 72 of assembly 10, two separate auxiliary light sources and means for directing light from these sources up tubular section 66 may be readily provided as stated previously. In addition, as also stated previously, causing the luminance of background 12B or 14B to appear unchanged as viewed through and outside beam-splitter 60 can be accomplished visually or by means of an optical sensor. In this regard, the term "as viewed" means as viewed by the eye of an individual or as viewed by means of optical sensing.

What is claimed is:

1. A method of determining the amount of equivalent sphere illumination on a given task as viewed from a given viewing point, comprising:
   a. locating said given task and a contrasting colored given reference in a lighted first area, said task and reference being oriented in a fixed way as viewed from said viewing point;
   b. at said viewing point, viewing said task and reference through adjustable light filtering means;
   c. adjusting said light filtering means to an adjusted position to provide specific visibility of said task from said viewing point and through said filtering means while causing the luminance of said reference at least to appear unchanged as viewed through said adjusted filtering means from a predetermined point behind said filtering means regardless of the adjusted position of said light filtering means;
   d. positioning a second task and a second reference, respectively similar in color to said given task and given reference, in a second area, said second task and second reference, as viewed from an associated viewing point, being oriented in substantially the same way as said given object and given reference are oriented as viewed from said given viewing point;
   e. illuminating said second task and second reference with sphere illumination;
   f. with said light filtering means fixed in said adjusted position, viewing said second task and second reference through said filtering means from said associated viewing point;
   g. varying the intensity of sphere illumination on said second task and second reference until the visibility of said second task, as viewed from said associated viewing point through said filtering means, is substantially equal to said specific visibility while causing the luminance of said second reference at least to appear unchanged as viewed through said filtering means from a associated predetermined point; and
   h. thereafter, measuring the intensity of sphere illumination on said second task.

2. A method according to claim 1 wherein said step of causing the luminance of said given reference at least to appear unchanged as viewed through said adjusted filtering means from said predetermined point includes:

a. directing an adjustable amount of light from a light source towards said light filtering means, b. positioning said filtering means and said predetermined point relative to one another and relative to the light from said source such that at least some of the light is reflected off of said light filtering means and in the direction of said predetermined point, and c. adjusting the amount of said reflected light so as to cause the luminance of said given reference to appear unchanged as viewed through said adjusted filtering means from said predetermined point.

3. A method according to claim 2 wherein said step of causing the luminance of said second reference at least to appear unchanged as viewed through said adjusted filtering means from said associated predetermined point includes:

a. directing an adjustable amount of light from a light source towards said light filtering means, b. positioning said filtering means and said associated predetermined point relative to one another and relative to the light from said last-mentioned source such that at least some of the light is reflected off of said light filtering means and in the direction of said associated point, and c. adjusting the amount of said last-mentioned reflected light so as to cause the luminance of said second reference to appear unchanged as viewed through said adjusted filtering means from said associated point.

4. A method according to claim 3 wherein:

a. said predetermined point and said associated predetermined point are identical to said given viewing point and associated viewing point, respectively, and b. said steps of causing the luminance of said given reference and said second reference includes respectively viewing said references from said viewing points by the individual eye.

5. A method according to claim 1 wherein said given task and said second task are viewed alternately.

6. A method according to claim 1 wherein both of said tasks and their associated references are viewed from substantially the same point.

7. A method according to claim 1 wherein said given task and given reference are respectively substantially identical to said second task and said second reference.

8. A method according to claim 1 wherein said second task and said second reference are positioned in a second area partially defined by a surface which comprises a segment of a sphere and which substantially uniformly diffusely reflects light directed thereon.

9. A method according to claim 8 wherein said surface segment comprises a hemisphere.

10. A method according to claim 1 wherein each of said references comprises a flat surface, wherein each of said tasks comprises a symbol on a respective one of said flat surfaces and wherein each of said tasks and references are oriented such that optically they are viewed at an angle from perpendicular lines through said flat surfaces.

11. A method according to claim 10 wherein said flat surfaces lie in a horizontal plane and wherein said angle is approximately 25°.

12. A method according to claim 10 wherein said flat surfaces lie in a plane which extends 15° from the horizontal and wherein said angle is approximately 10°.

13. A method according to claim 1 wherein said specific visibility is threshold visibility.

14. A method of determining the amount of equivalent sphere illumination on an object as viewed from a selected viewing point, comprising:

a. positioning a specific object including a flat surface having a darker colored symbol theron in a lighted first area;

b. selecting a viewing point and orienting said object relative to said point such that, at said point, the flat surface of said object is viewed at an acute angle to a line normal to said surface;

c. at said viewing point, viewing said surface through adjustable light filtering means;

d. adjusting said light filtering means to a position which will provide threshold visibility of said symbol, as viewed from said viewing point and causing the luminance of said flat surface at least to appear unchanged as viewed through said adjusted filtering means from said viewing point regardless of the adjusted position of said filtering means;

e. positioning a reference object including a flat surface having a symbol thereon in a second area, both of said object surfaces being of the same color and both of said symbols being of the same color, said second area being partially defined by a hemispherical surface which substantially uniformly diffusely reflects light directed thereon;

f. orienting said reference object relative to said selected viewing point such that, at said point, the flat surface of said reference object is viewed at an acute angle to a line normal to said last-mentioned surface, said last-mentioned angle being substantially identical to the angle at which said specific object is in view;

g. illuminating said reference object with sphere illumination;

h. with said light filtering means in said adjusted position, viewing said reference object through said filtering means from said viewing point;

i. varying the intensity of sphere illumination on said reference object until the visibility of the symbol on said reference object, as viewed from said viewing point through said light filtering means, is substantially equal to the threshold visibility of the symbol on said specific object as viewed from said viewing point through said filtering means and causing the luminance of the flat surface of said reference object at least to appear unchanged as viewed through said adjusted filtering means from said viewing point; and j. thereafter measuring the intensity of sphere illumination.

15. A method according to claim 14 wherein:

a. said step of causing the luminance of said surface of said specific object to appear unchanged as viewed through said adjusted filtering means from said viewing point includes i. directing a first adjustable amount of light from a light source towards said light filtering means, ii. positioning said filtering means and said viewing point relative to one another and relative to said beam of light such that at least some of the light from said source is reflected off of said filtering means and in the direction of said viewing point, and iii. adjusting the amount of said reflected light so as to cause the luminance of said last-mentioned surface to appear unchanged as viewed through said adjusted filtering means from said viewing point; and b. said step of causing the luminance of said surface of said reference object to appear unchanged as viewed through said adjusted filtering means from said viewing point includes
   i. directing a second adjustable amount of light from a light source towards said positioned light filtering means such that at least some of the light is reflected off of said filtering means and in the direction of said viewing point, and
   ii. adjusting the amount of said last-mentioned reflected light so as to cause the luminance of said last-mentioned surface to appear unchanged as viewed through said adjusted filtering means from said viewing point.

16. A method according to claim 15 wherein said specific object and said reference object are viewed alternately and including:
   a. viewing a portion of the surface of said specific object from said viewing point but outside said filtering means while simultaneously viewing the symbol of said specific object through said filtering means from said viewing point; and
   b. viewing a portion of the surface of said reference object from said viewing point but outside said filtering means while simultaneously viewing the symbol of said reference object through said filtering means from said viewing point.

17. A method according to claim 16 wherein said portions of each of said surfaces are viewed by the individual eye.

18. A method according to claim 16 wherein said portions of each of said surfaces are viewed by optical sensing means.

19. A method of determining the amount of equivalent sphere illumination on a given task as viewed from a given viewing point, comprising:
   a. locating said given task and a contrasting colored given reference in a lighted first area, said task and reference being oriented in a fixed way as viewed from said viewing point;
   b. at said viewing point, viewing said task and said reference;
   c. as viewed from said viewing point, optically changing the contrast between said task and reference to a specific level while causing the luminance of said reference to appear unchanged from said viewing point;
   d. positioning a second task and a second reference, respectively similar in color to said given task and given reference, in a second area, said second task and second reference, as viewed from an associated viewing point, being oriented in substantially the same way as said given task and given reference are oriented as viewed from said given viewing point;
   e. illuminating said second task and second reference with sphere illumination;
   f. at said associated viewing point, viewing said second task and second reference;
   g. varying the intensity of sphere illumination on said second task and second reference until the contrast between said second task and second reference, as viewed from said associated viewing point is substantially equal to said specific contrast level while causing the luminance of said second reference to appear unchanged as viewed from said associated viewing point; and
   h. thereafter, measuring the intensity of sphere illumination on said second task.

20. An assembly for determining the amount of equivalent sphere illumination of a given task, comprising:
   a. means for supporting said given task and a contrasting colored given reference in a lighted area;
   b. a substantially closed housing including means for supporting a second task and a second contrasting colored reference therein;
   c. means for illuminating said second task and said second reference within said housing with sphere illumination;
   d. means for adjusting the intensity of sphere illumination on said second task and second reference;
   e. adjustable light filtering means;
   f. means simultaneously viewing said given task and given reference through said light filtering means and for simultaneously viewing said second task and second reference through said light filtering means, whereby the visibility of said tasks, as viewed through said filtering means, can be altered by adjusting said light filtering means;
   g. means for making the luminance of said references at least appear constant, as viewed through said filtering means, regardless of changes in visibility of said tasks; and
   h. means for measuring the intensity of sphere illumination on said second task and second reference.

21. An assembly according to claim 20 wherein said viewing means includes means for alternately viewing said given task and given reference and said second task and second reference from the same viewing point.

22. An assembly according to claim 20 wherein:
   a. said light filtering means comprises a device which allows at least some light to pass therethrough from a first surface to a second surface of the device and for reflecting at least some light off of said second surface, and
   b. said means for making the luminance of said references appear constant includes means for directing light onto the second surface of said device whereby at least some of the light is reflected off of said second surface, said device being oriented to direct said reflected light parallel with the light passing through the device from said first surface to said second surface.

23. An assembly according to claim 22 wherein said light directing means includes means for alternately directing two different beams of light toward said device.

24. An assembly according to claim 20 wherein said light filtering means is positioned relative to said viewing means such that a first portion and a second portion of each of said references can be simultaneously viewed in side-by-side relationship, one of said portions being viewed through said light filtering means and the other of said portion being viewed outside said filtering means.

25. An assembly according to claim 24 including optical sensing means for comparing the luminance of said one portion as it appears from behind said filtering means with the luminence of said other portion as it appears outside said filtering means.

26. An assembly according to claim 20 wherein said illuminating means includes an internal hemispherical surface defined by said housing, which surface substantially uniformly diffusely reflects light directed thereon.

27. An assembly according to claim 26 wherein said means for supporting said reference object includes a flat surface extending entirely across the circular periphery of said hemispherical surface.

28. An assembly according to claim 20 wherein said viewing means comprises an arrangement for alternately viewing both of said tasks from a common viewing point through said adjustable light filtering means when said objects are supported by their associated supporting means.

29. An assembly according to claim 28 wherein said arrangement includes light direction changing means oriented such that both of said tasks are viewed indirectly from said point.

30. An assembly for determining the amount of equivalent sphere illumination on a given task, comprising:
   a. means for supporting said given task and a contrasting colored given reference in a lighted area;
   b. a substantially closed housing including
      i. an internal hemispherical surface which substantially uniformly diffusely reflects light directed thereon, and
      ii. an internal flat surface capable of passing light therethrough and adapted to support a second task and contrasting colored second reference;
   c. means providing light through said flat surface and into said housing for illuminating said second task and second reference within said housing with sphere illumination;
   d. means for varying the light passing through said flat surface and into said housing whereby to vary the intensity of sphere illumination on said second task and second reference;
   e. an optical device having opposite first and second surfaces, said device being capable of passing variable amounts of light therethrough from said first surface to said second surface along a predetermined path and being capable of reflecting off of said second surface at least some light which is directed onto said second surface;
   f. means for supporting said optical device in predetermined orientation;
   g. means for viewing simultaneously said given task and a portion of said given reference from a predetermined viewing point through said optical device and for alternatively viewing simultaneously said second task and a portion of said second reference from said viewing point through said optical device, whereby the visibility of said tasks, as viewed through said device from said viewing point, can be altered by varying the amount of light passing through said device from said first surface to said second surface, said optical device being positioned such that
      i. a second portion of said given reference can be viewed from said viewing point simultaneously with the first-mentioned portion thereof but outside said optical device,
      ii. a second portion of said second reference can be viewed from said viewing point simultaneously with the first-mentioned portion thereof but outside said optical device;
   h. means for making the luminance of said first-mentioned reference portion at least appear unchanged, as viewed through said optical device, regardless of the changes in visibility of said tasks, said last-mentioned means including means for alternatively directing two beams of light to the second surface of said optical device, whereby light from said beams is reflected off of said second surface in the same direction as light passing through said device from said first surface to said second surface, and means for varying the amount of light directed to said second surface; and
   i. means for measuring the intensity of sphere illumination on said second task and second reference.

* * * * *